United States Patent [19]

Russ

[11] Patent Number: 4,869,126
[45] Date of Patent: Sep. 26, 1989

[54] MECHANICAL MODE SHIFTER

[75] Inventor: David E. Russ, Rockford, Ill.

[73] Assignee: Sundstrand Corporation, Rockford, Ill.

[21] Appl. No.: 211,446

[22] Filed: Jun. 23, 1988

[51] Int. Cl.$^4$ .................. F16H 37/06; F16H 27/06
[52] U.S. Cl. .................. 74/665 GA; 74/436; 192/93 A; 192/148
[58] Field of Search ............ 74/436, 665 G, 665 GA; 192/93 A, 148, 149

[56] References Cited

U.S. PATENT DOCUMENTS

| | | | |
|---|---|---|---|
| 1,236,498 | 8/1917 | Stineman et al. | 74/436 |
| 2,259,948 | 10/1941 | Bullard, III | 29/50 |
| 2,266,838 | 12/1941 | Winn | 74/436 X |
| 2,589,940 | 3/1952 | Hayek | 74/436 |
| 2,593,416 | 4/1952 | Dawson | 74/436 X |
| 2,926,012 | 2/1960 | Maher | |
| 2,927,624 | 3/1960 | Hughes | |
| 3,058,366 | 10/1962 | Matthews | 74/665 GA X |
| 3,136,168 | 6/1964 | Matovich, Jr. | 74/436 X |
| 3,326,058 | 6/1967 | Morrison | 74/393 |
| 3,387,570 | 6/1968 | Pulcrano et al. | 105/282 |
| 3,473,390 | 10/1969 | Brown et al. | 74/1 R |
| 3,808,969 | 5/1974 | Pearce | 74/436 X |
| 3,965,618 | 6/1976 | Pickles | 74/435 X |
| 4,302,870 | 12/1981 | Schalles et al. | 74/820 X |
| 4,466,310 | 8/1984 | Rulseh | 74/665 GA |

Primary Examiner—Allan D. Herrmann
Attorney, Agent, or Firm—Wood, Dalton, Phillips Mason & Rowe

[57] ABSTRACT

A mechanical mode shifter is provided including an input and first and second outputs, which rotate simultaneously during a first portion of operation. The first output is coupled to the input for providing a continuous drive to the first output. Timing means including sector gears are coupled to the first output. At a preselected point in time, the timing means cause the engagement of the sector gears with other gears for the purpose of disengaging a jaw clutch and decelerating a shaft on the second output, such that the second output is driven cyclically while the first output is driven continuously.

30 Claims, 9 Drawing Sheets

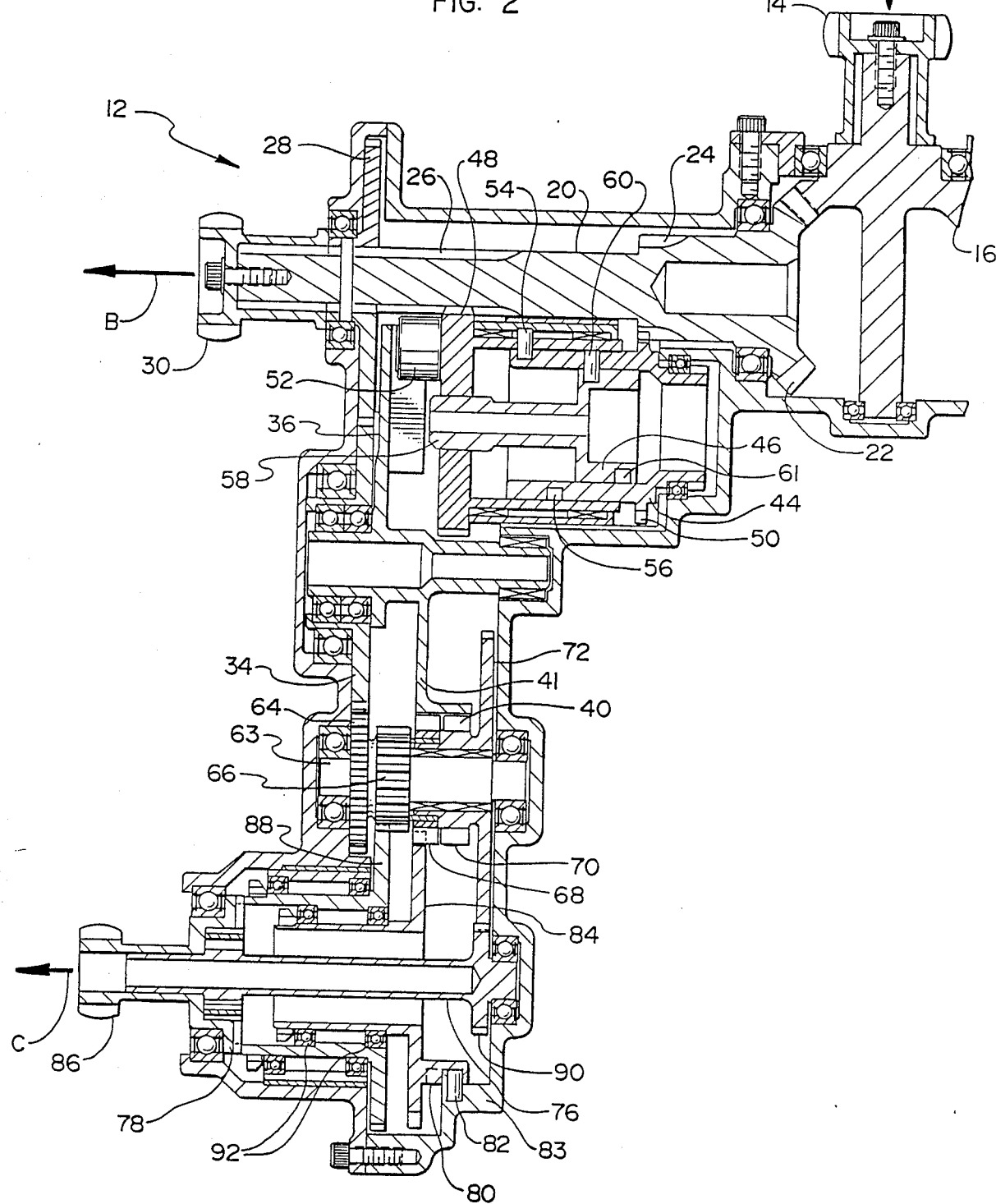

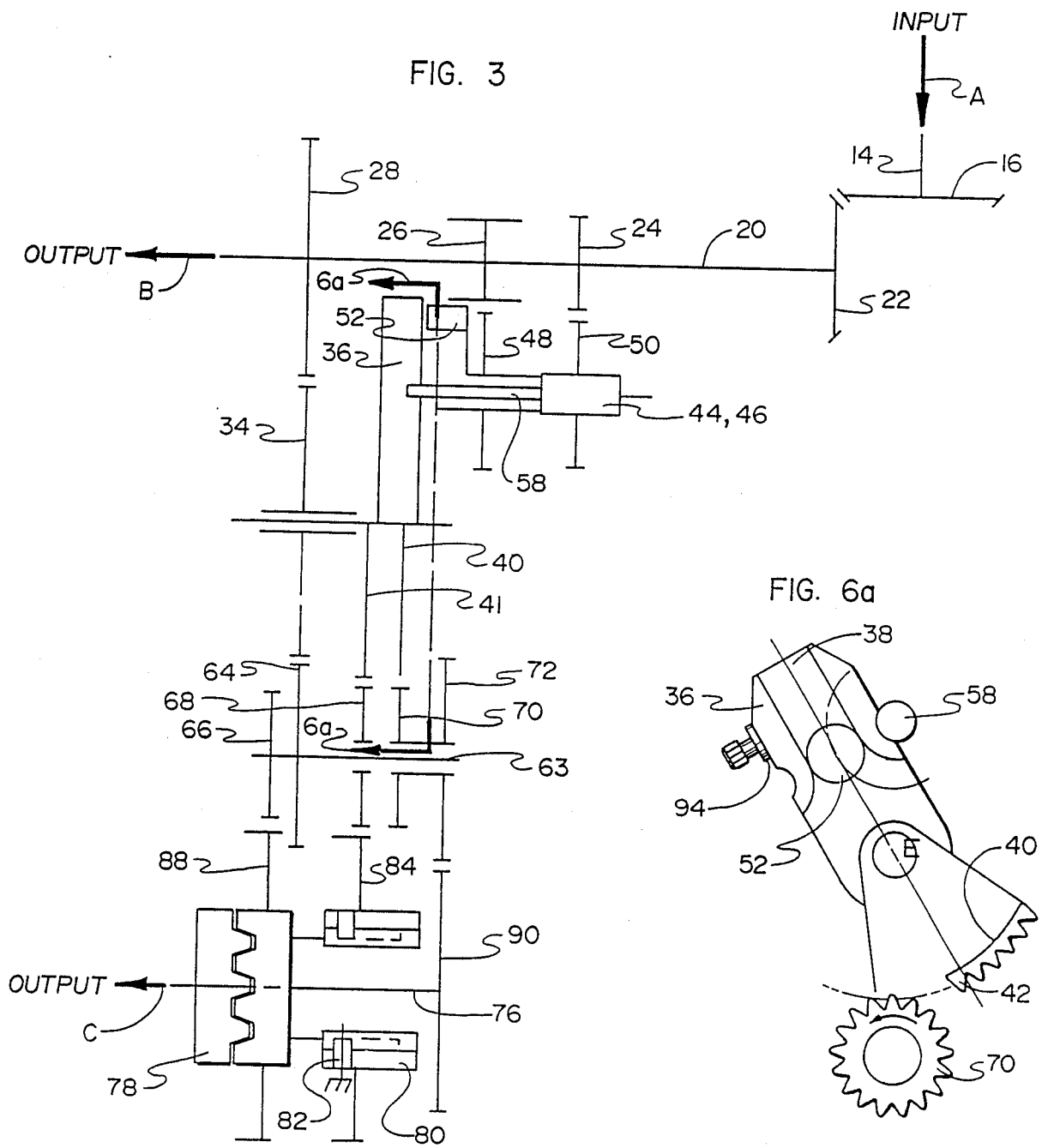

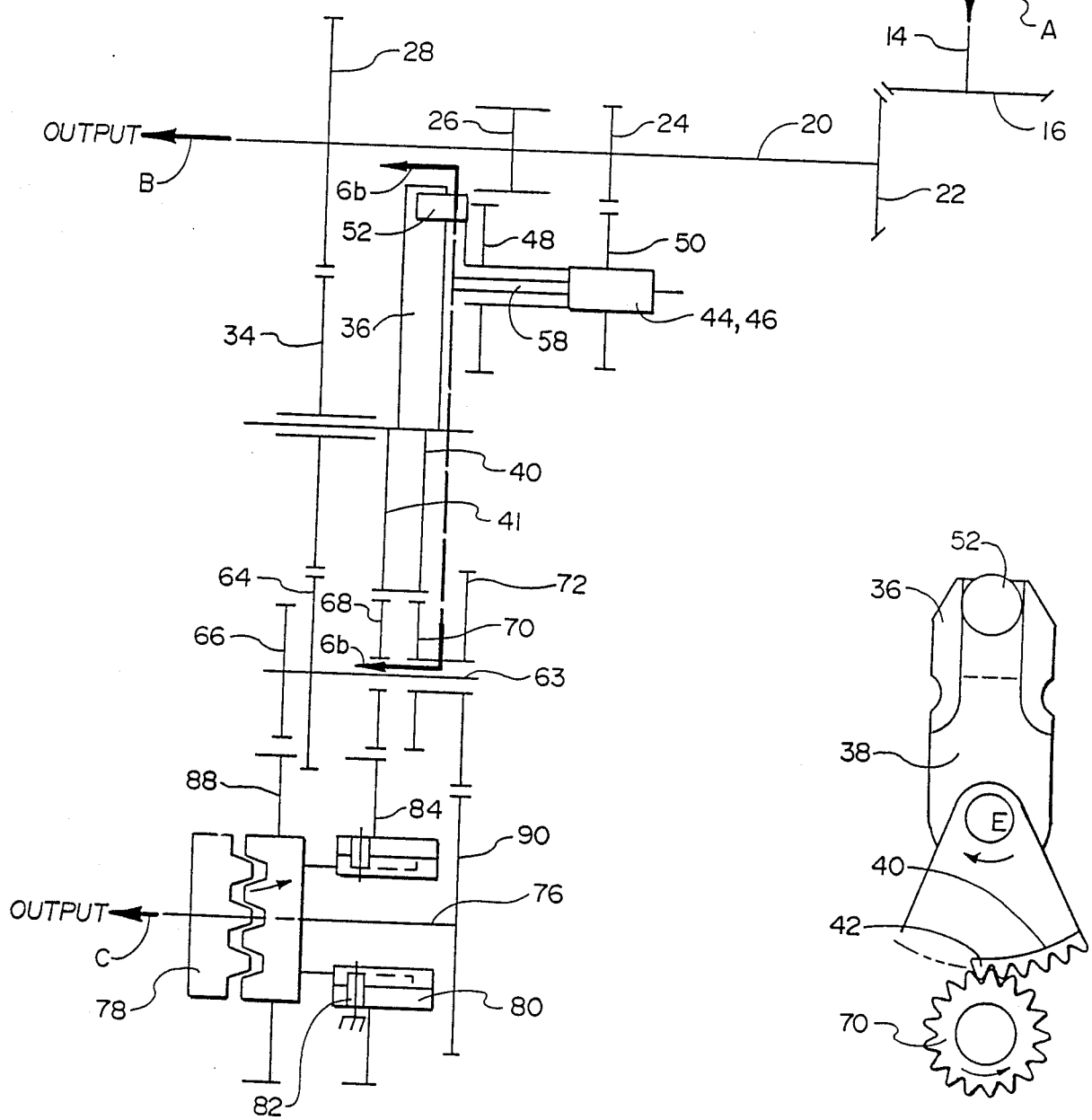

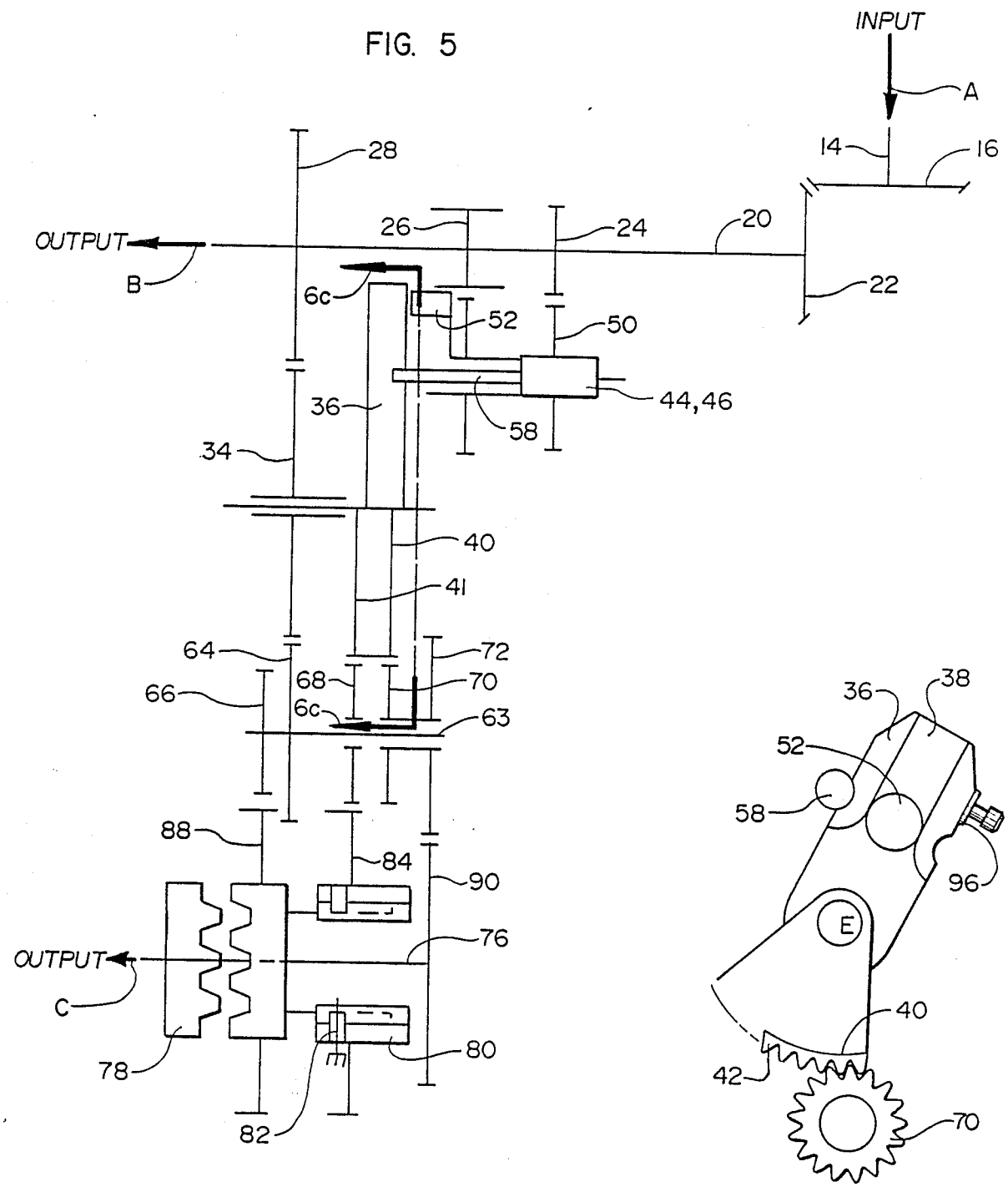

MECHANICAL MODE SHIFTER

FIELD OF THE INVENTION

This invention generally relates to mechanical actuation systems, and more specifically, to a mechanical shifting device for aircraft actuation systems.

BACKGROUND OF THE INVENTION

In a number of mechanical systems, as, for example, aircraft actuation systems, it is necessary to cause two simultaneous movements to occur in which a first body is moved during the first portion of travel of a second body, but the first body stops while the second body continues to travel. For example, in separate but related actuation systems such as, door/spoiler systems, it is necessary to cause simultaneous movements of the door and the spoiler and, after a preselected period of time, to stop movement of the spoiler while the door continues to move.

Typically, these separate but related actuation systems have required either separate power drive units (prime movers) or mechanical shifting devices. The use of separate power drive units is undesirable in terms of weight, volume and interface/mounting complexity. The conventional mechanical shifting devices have inherent sequencing, timing and dynamic load problems.

The present invention is directed to a mechanical mode shifter which solves the problems associated with the conventional mechanical shifting devices, identified above.

SUMMARY OF THE INVENTION

An object, therefore, of the invention is to provide a new and improved mechanical mode shifter for allowing a single power drive unit to drive separate but related actuation systems which need to be started and stopped separately from each other while maintaining accurate positioning of the two systems.

In a first embodiment of the invention, a mechanical mode shifter is provided comprising input means including a primary drive gear. First output means including gear means are coupled to the primary drive gear of the input means for providing a continuous drive to the first output means. Timing means are provided including a driven gear coupled to the first output means. The timing means further includes geneva means including sector gears, and cam means for engagement with the geneva means. Intermediate gear train means are coupled to the timing means driven gear and cyclically coupled to the sector gears of the geneva means. Further, second output means are coupled to the intermediate gear train means and include clutch means. The second output means are disengageable through the engagement of the geneva means and the sector gears attached thereto with the intermediate gear train means. The engagement thereof causing the intermediate gear train means to decelerate and ground a shaft on the second output means and also causing the disengagement of the clutch means, whereby the second output means is driven cyclically while the first output means is driven continuously.

The geneva means comprises an inverse geneva and the cam means comprises first and second axial cams. The first axial cam is a barrel cam which includes a gear member with first and second pins attached thereto. The first pin is engageable with the inverse geneva and the second pin is movable in a slot around the periphery of the barrel cam causing the first pin to move both axially and circumferentially into engagement with the inverse geneva, thereby moving the gear means attached to the geneva means about the center line of the timing means driven gear. The second axial cam is operatively associated with the barrel axial cam and further includes third and fourth pins wherein the fourth pin is used to lock the inverse geneva.

The sector gears comprise first and second sector gears. The first sector gear is in continuous engagement with the intermediate gear train means while the second sector gear is cyclically engageable with the intermediate gear train means.

The clutch means comprises a jaw clutch. Means for disengaging the jaw clutch are provided comprising an axial cam in cooperation with a gear in meshing relation with the first sector gear.

In a second and highly preferred embodiment of the present invention, a mechanical mode shifter is provided including input means having a primary drive gear. Intermediate means are provided including gear means coupled to the primary drive gear of the input means for providing a continuous drive to the intermediate means, and clutch means. Timing means are provided including geneva means driven by the intermediate means, and cam means associated with the geneva means including first and second sector gears. Further, output means are coupled to the intermediate means, the intermediate means being disengageable from the input means through the engagement of the sector gears on the cam means with the intermediate means to decelerate and ground a shaft and disengage the clutch means on the intermediate means, thereby grounding the output means coupled thereto, whereby the output means is driven cyclically while the input means is driven continuously.

The geneva means comprises a geneva drive gear coupled to the intermediate means, and a geneva wheel driven by the geneva drive gear.

The geneva drive gear includes an axial pin engageable with slots on the geneva wheel for providing intermittent motion to the geneva wheel. The geneva wheel is a six-slot geneva.

The cam means comprises a face cam connected to and rotatable with the geneva wheel to provide a timing cycle for engagement of the sector gears on the cam means with the intermediate means.

The first sector gear is in continuous engagement with the intermediate means while the second sector gear is cyclically engageable with the intermediate means.

The clutch means comprises a jaw clutch. Means for disengaging the jaw clutch are provided comprising an axial cam in cooperation with a gear in meshing relation with the first sector gear.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like in the Figures and in which:

FIG. 2 is a cross section of the first embodiment of FIG. 1;

FIGS. 3-5 are sequential operational, schematic views of the embodiment of FIGS. 1 and 2;

FIG. 6a is an elevational view of the structural components of the timing mechanism as viewed generally in the direction of line 6a-c-6a of the schematic illustration of FIG. 3;

FIG. 6a is an elevational view of the structural components of the timing mechanism as viewed generally in the direction of line 6b—6b of the schematic illustration of FIG. 4;

FIG. 6c is an elevational view of the structural components of the timing mechanism as viewed generally in the direction of line 6c—6c of the schematic illustration of FIG. 5;

DETAILED DESCRIPTION OF A FIRST EMBODIMENT

Figure 1:
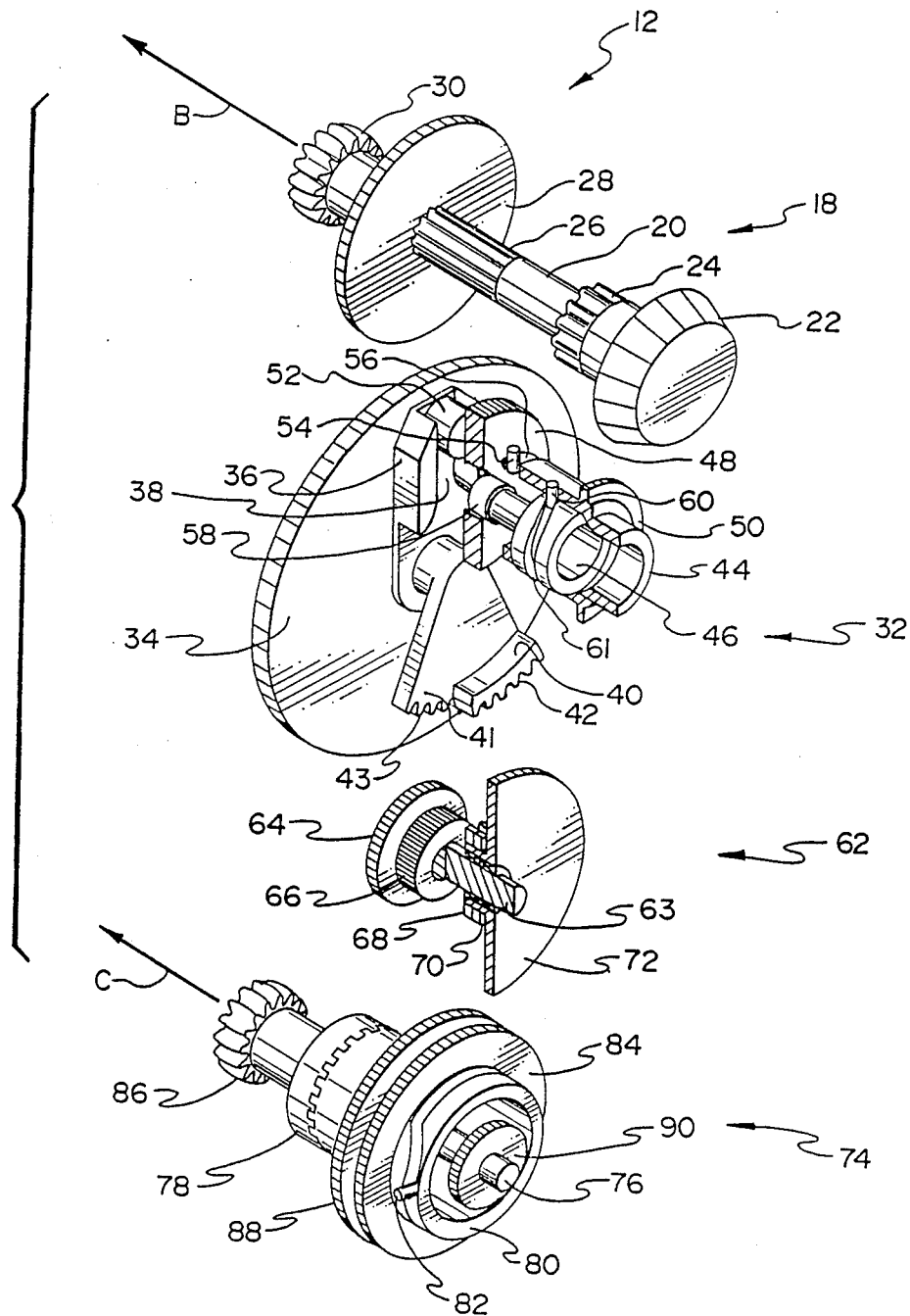
FIG. 1 is a perspective view of the components of a first embodiment of the mechanical mode shifter of the present invention.

Referring to the drawings in greater detail, and first to FIGS. 1 and 2, a first embodiment of the mechanical mode shifter is illustrated and generally designated 12.

The mechanical mode shifter 12 comprises input means wherein an input A (FIG. 2) provides for the rotation of a shaft 14 and a primary driving gear in the form of a bevel gear 16.

As shown in FIGS. 1 and 2, the mechanical mode shifter further comprises first output means, generally designated 18. First output means 18 includes a shaft 20 and gear means in the form of a bevel gear 22. Bevel gear 22 is coupled to bevel gear 16 of the input means, as shown in FIG. 2, for providing a continuous drive to a first output B via the first output means 18. Further, first output means 18 includes gears 24, 26, 28 and 30. The gears 24, 26 are coupled to a timing means, generally designated 32 while gear 28 is coupled to driven gear 34.

Timing means 32 includes geneva means in the form of an inverse geneva 36 with a slot 38 and including sector gears 40, 41 with teeth 42, 43 respectively, and cam means in the form of first and second axial cams 44, 46 for engagement with the geneva means. First axial cam 44 is a barrel cam which includes first and second gear members 48, 50. First gear member 48 includes a first pin 52 and a second pin 54. The first pin is engageable with slot 38 of inverse geneva 36. Second pin 54 is movable in a cam track 56 round the periphery of first axial cam 44.

Second axial cam 46 is operatively associated with first axial cam 44 and includes third and fourth pins 58, 60. Fourth pin 60 is moveable in a cam track 61.

The mechanical mode shifter further includes intermediate gear train means, generally designated 62, comprised of a shaft 63 and gears 64, 66, 68, 70 and 72. Gear 64 is continuously coupled to the driven gear 34. Gear 68 is continuously coupled to first sector gear 41 while gear 70 is cyclically coupled to second sector gear 40. Although not shown, the first sector gear 41 may be a complete gear.

Still further, the mechanical mode shifter includes second output means, generally designated 74, which provides a second output generally designated C. The second output means 74 includes a torsion shaft 76, clutch means in the form of a jaw clutch 78, and means for disengaging the jaw clutch comprising an axial cam 80 with a pin 82, stationarily mounted in a housing wall 83, in cooperation with a gear 84 in meshing relationship with the gear 68 on intermediate gear train means 62. Second output means 74 further includes a spline 86, and gears 88 and 90 which are in continuous meshing relation with gears 66 and 72, respectively, on the intermediate gear train means 62. Gear 90 is integrally connected to torsion shaft 76 while bearings 92 connect axial cam 80 through the shaft 76 to the jaw clutch 78.

The operation of the first embodiment of the mechanical mode shifter will now be described with reference to FIGS. 3-5.

FIG. 3 is a schematic illustration of the mechanical mode shifter in its connected condition wherein the second output means 74 is connected to the first output means 18 which rotates simultaneously therewith to produce respective outputs B and C. The direct connection or power train with first output means 18 is provided as described below. The input means, through the bevel gear 16 and bevel gear 22, provides for rotation of the first output means 18 and associated shaft 20. Gear 28 connects shaft 20 to gear 34. Gear 34 meshes with gear 64 on shaft 63 of intermediate gear train means 62. Gear 88 meshes with gear 66 which rotates with gear 64 to continue the gear train. Finally, the second output means 74 and associated shaft 76 is connected to gear 88 through the closed jaw clutch 78, to produce output C. In its connected condition, inverse geneva 36 is locked in position by the third pin 58, and the first pin 52 is disengaged and rotating freely.

Shifting from the connected condition to the grounded condition is illustrated in FIG. 4.

As shown in FIG. 4, gears 24 and 26 both are driven from shaft 20. The gear ratios used will cause gear 50 to rotate slightly faster than gear 48 to produce a small relative velocity between the two parts, whenever shaft 20 is in motion. The relative motion will drive the second pin 54 along the axial cam track 56 between gears 48 and 50. As the second pin 54 moves to the right in cam track 56, the cam track will shift pin 52 into engagement with slot 38 of the inverse geneva 36 at a repeatable location. A dwell zone for pin 54 is provided during inverse geneva motion, then the first pin 52 is withdrawn. Gear 48 which contains the first pin 52 continually rotates during the sequence. Thus, gear 48 is both rotating about its own axis and translating axially due to the movement of the first axial cam 44. This results in a helical type of path where the first pin 52 spirals into engagement with the inverse geneva 36. While it is engaged, the first axial cam 48 dwell prevents axial movement while the first pin 52 rotates about the center line of gear 48. Thus, the rotation of pin 52 causes the geneva wheel 36 to move from the position shown in FIG. 6A, to the position shown in FIG. 6B, and finally to the position shown in FIG. 6C. As the first pin 52 leaves slot 38 of the inverse geneva 36, the first axial cam 44 pulls gear 48 and the first pin 52 to the right to spiral the first pin 52 out of the way. The first axial cam 44 provides a dwell outside of the zones above to prevent the first pin 52 from entering the inverse geneva 36 again at any other point in the cycle.

During this shifting sequence, fourth pin 60 operates to produce the opposite motion of the first axial cam cam 44 just described. When gear 48 and first pin 52 are engaged with inverse geneva 36, the fourth pin 60 travels in the axial cam track 61 which also is driven by the relative motion between gears 48 and 50 to disengage the third pin 58 so that inverse geneva 36 can rotate.

As the first tooth 42 of second sector gear 40 contacts gear 70, gear 70 and, therefore, adjacent gear 68 connected to gear 70 will begin to rotate. Since axial cam 84 is connected to gear 68, it will also begin to rotate. As a result of the rotation, axial cam 84 will move axially to the right. Since gear 88 is connected to axial cam 84 by bearings 92, it follows that gear 88 will also move to the right. As gear 88 moves to the right, jaw clutch 78 which is connected to gear 88 will start to separate. Since inverse geneva 36 is running slightly faster at this time, the output C load is transferred to the inverse geneva. As the geneva driven output C starts to slow down relative to gear 88, axial movement predominates to complete the shift. Jaws 78 are completely disengaged before gear 88 has a significantly larger relative velocity than the output C (as driven by inverse geneva 36). The inverse geneva 36, through gears 72 and 90, then the shaft 76 and, therefore, is free to slow the output C down to zero from this position.

FIG. 5 is an illustration of the mechanical mode shifter in its grounded condition wherein output C has stopped and jaw clutch 78 is completely disengaged, breaking the connection between first output means 18 and second output means 74. As shown therein, inverse geneva 36 is locked in position by third pin 58, and first pin 52 is disengaged.

The positions of the inverse geneva 36 and its associated first and second sector gears 40, 41 in the connected, shifting, and grounded conditions are illustrated in FIGS. 6a–c, respectively.

FIG. 6a is exemplary of the position of inverse geneva 36 where first output means 18 is connected to second output means 74, to produce respective outputs B and C. As shown in FIG. 6a, gear 70 is spinning freely at this point. The third pin 58 keeps inverse geneva 36 locked against a stop 94. At the start of the timing sequence, first pin 52 engages inverse geneva 36 at the bottom of slot 38, as shown in FIG. 6a, and third pin 58 will retract to allow rotation of the inverse geneva. The first pin 52, rotating about the same axis as the third pin 58, causes inverse geneva 36 to rotate in the same direction about point E.

FIG. 6b shows the engagement of tooth 42 of second sector gear 40 near maximum geneva velocity at the start of a shift.

FIG. 6c shows the position of inverse geneva 36 where the second output means 74 is grounded. In this position, second sector gear 40 and gear 70 remain engaged and the third pin 58 locks inverse geneva 36 against stop 96 to prevent movement thereof. Once the inverse geneva is locked, first pin 52 will exit the bottom of slot 38.

The reversing of the input means will reverse all the processes just described. At the correct time, first pin 52 will spiral into inverse geneva 36 and third pin 58 will retract. Thus, the inverse geneva will accelerate output shaft 76 up to speed, engage jaw clutch 78, and first tooth 42 of gear 40 will disengage from gear 70 of the intermediate gear train means 62. Finally, third pin 58 will lock the inverse geneva into place against stop 94 to, await the next cycle.

DETAILED DESCRIPTION OF A SECOND AND HIGHLY PREFERRED EMBODIMENT

Figure 7:
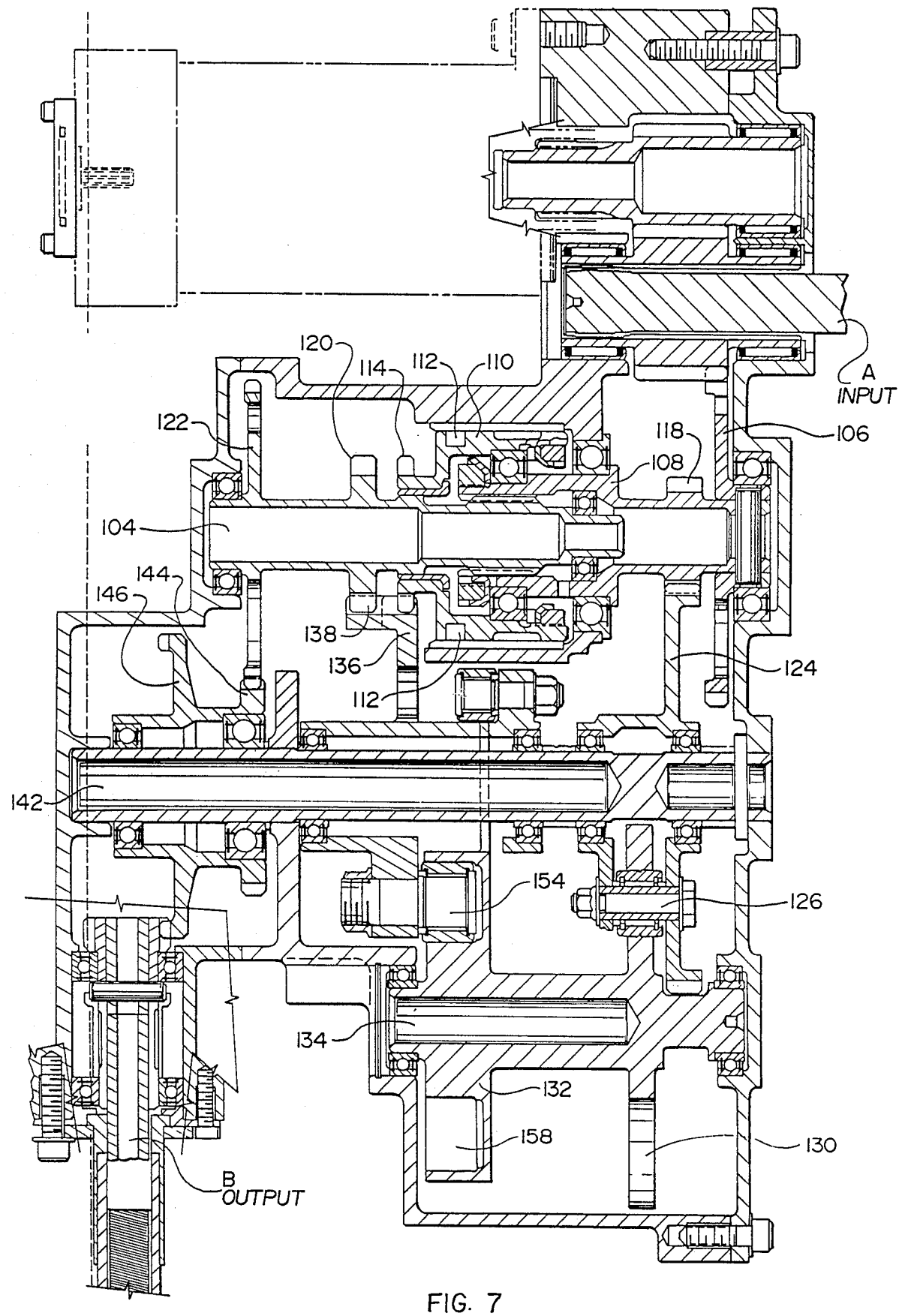
FIG. 7 is a cross section of a second and highly preferred embodiment of the mechanical mode shifter of the invention.
Figure 8:
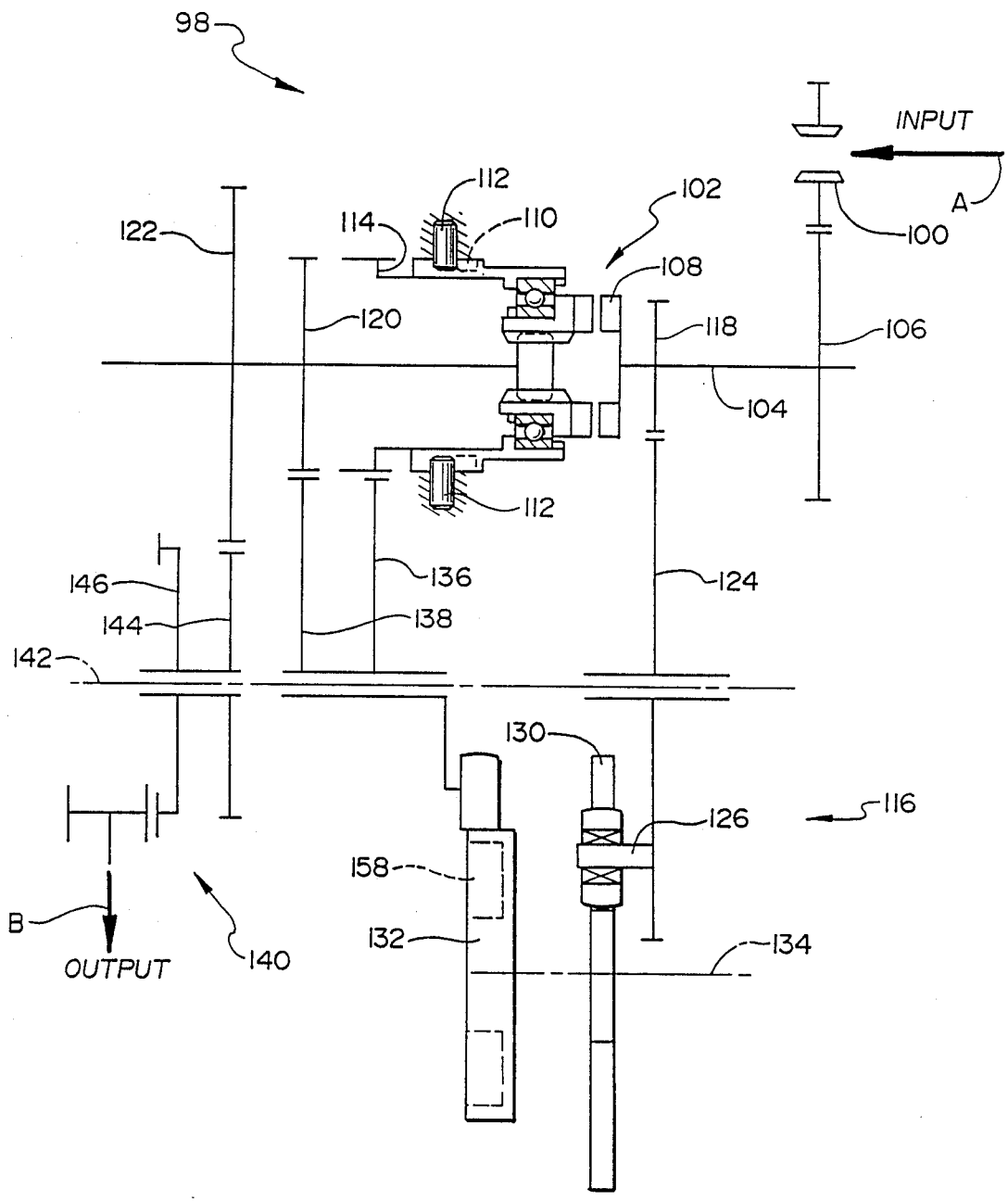
FIG. 8 is a schematic view of the preferred embodiment of FIG. 7.

A second and highly preferred embodiment of the mechanical mode shifter of the invention is illustrated in cross section in FIG. 7, and in schematic fashion in FIG. 8, and is generally designated 98.

Referring to FIG. 8, input means are included wherein an input A is provided to enable the rotation of a primary gear 100. Although not shown, input A is the output of a motor which, before reaching input A, is used to power another system.

Intermediate means 102 are shown in FIG. 8 as including a shaft 104 and gear means in the form of a gear 106 coupled to the primary drive gear 100 of the input means for providing a continuous drive to intermediate means 102. The intermediate means further comprises clutch means in the form of a jaw clutch 108, and means for disengaging the jaw clutch comprising an axial cam 110 with a pin 112 in cooperation with a gear 114 on the intermediate means 102 to disengage jaw clutch 108 upon engagement of a timing means 116. The intermediate means further comprises gears 118, 120, and 122.

Although timing means 116 of the second and preferred embodiment is distinct in structure from timing means 32 of the first embodiment, it is to be noted that both structures are identical in function in that they both cause the rotation and engagement of sector gears associated therewith, for the purpose of decelerating a shaft and disengaging a jaw clutch, to ground the rotation of an output.

The timing means 116 includes geneva means comprised of a geneva drive gear 124 coupled to gear 118 of intermediate means 102. The geneva drive gear includes an axial pin 126 engageable with slots 128 (shown in FIG. 9) on a geneva wheel 130 for providing intermittent motion to the geneva follower gear. Although the geneva wheel shown is a six-slot geneva, the number of geneva slots may vary with the amount of lost motion required.

Timing means 116 further includes cam means in the form of a face cam 132 connected to and rotatable with geneva wheel 130 by means of a shaft 134. Face cam 132 further includes a first sector gear 136 and a second sector gear 138 for engagement with gears 114 and 120, respectively, of intermediate means 102. It should be noted that first sector gear 136 is in continuous meshing relation with gear 114 while second sector gear 138 is cyclically engageable with gear 120.

FIG. 8 also shows an output means 140 producing an output B and comprised of a shaft 142, a gear 144 coupled to gear 122 of the intermediate means 102 and a face gear 146. Face gear 146 and gear 144 are connected.

Figure 9:
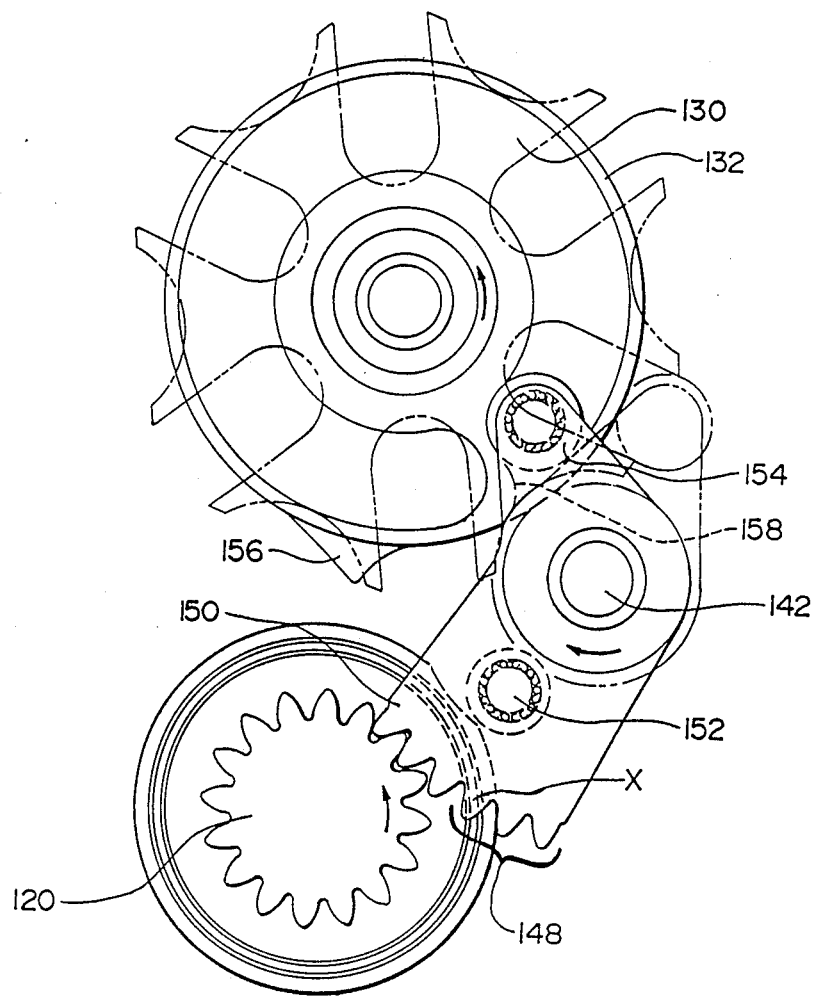
FIG. 9 is a side view of the timing mechanism of the embodiment of FIG. 7.
Figure 10A:
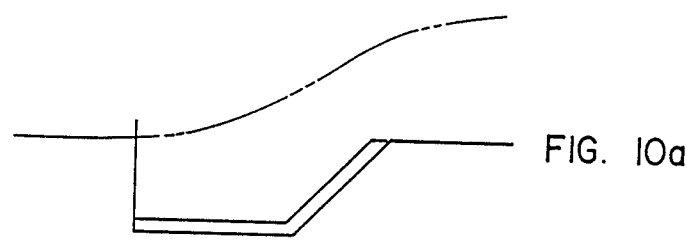
FIG. 10a-f is a schematic of the jaw clutch separation of the preferred embodiment of FIG. 7.
Figure 10B:
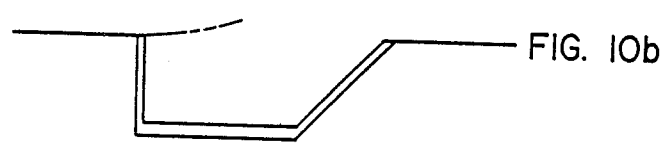
Figure 10C:
Figure 10D:
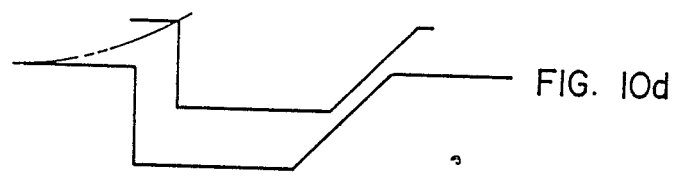
Figure 10E:
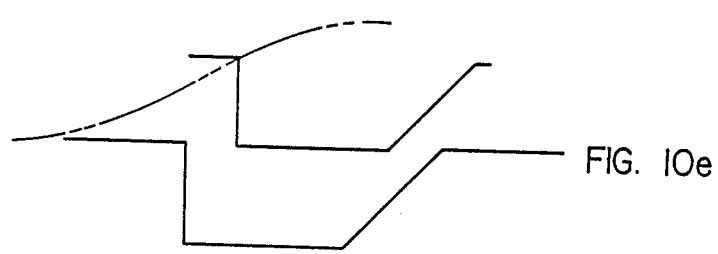
Figure 10F:
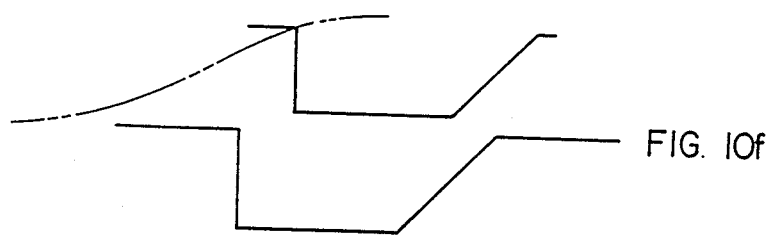

The timing means 116 of the second and preferred embodiment is further illustrated in FIG. 9. Face cam 132 and geneva wheel 130 on shaft 134 are shown together with first and second sector gears 136, 138 on shaft 142. As shown therein, the first and second sector gears 136, 138 are in different planes. The first sector gear includes teeth 148 while the second sector gear includes teeth 150. The first sector gear is in meshing relation with gear 114 which is not shown but is located behind gear 120 of the intermediate means 102 while the second sector gear will be in meshing relation with gear 120 of the intermediate means upon engagement of timing means 116. Sector gears 136, 138 further include first and second rollers 152, 154 wherein roller 152 and a ramp 156 on face cam 132 are in different planes than roller 154 in a slot 158 of face cam 132. In operation, roller 152 will force roller 154 to enter slot 158 when roller 154 reaches the top of ramp 156. At that time, roller 154 will take over entirely. The ramp 156 provides the necessary position and velocity control to make sector gear 138 mesh correctly with gear 120.

In operation, input means and output means 140 are initially connected and rotate simultaneously to thereby produce an output B. The direct connection of the input means and the output means is provided as follows. First, primary drive gear 100 of the input means provides for the rotation of gear 106 on shaft 104 of intermediate means 102. Thereafter, shaft 104 provides, through closed jaw clutch 108, for the rotation of gear 122 which provides rotation to gear 144 of output means 140. Gear 144, through shaft 142, provides rotation to face gear 146, thereby providing an output B.

Shifting from the connected condition just described to the condition wherein output means 140 is grounded is accomplished as follows. Geneva drive gear 124 on shaft 142 rotates whenever gear 118 coupled thereto rotates. As geneva drive gear 124 rotates, it will cause geneva wheel 130 on shaft 134 to rotate intermittently. In turn, this rotation will cause face cam 132 to rotate. At a predetermined time, face cam 132 will cause the rotation of sector gears 136, 138, associated therewith. That is, at the time wherein the first tooth "X" of the series of teeth 148 second sector gear 138 engages with gear 120 of intermediate means 102, shaft 104 will be accelerated slightly to take the output B and then the jaw clutch 108 can separate axially, as depicted sequentially in FIG. 10, to disconnect the output B from the input A. The process by which the jaw clutch is disengaged is similar to that described with respect to the first embodiment. When sector gear 138 is finally grounded by rollers 152 and 154 on the outside of cam 132 and jaw clutch 108 is fully disengaged, output means 140 will correspondingly be grounded since gear 120 is still coupled to gear 138.

Again, as with the first embodiment, the reversing of the input means will reverse all of the processes just described. That is, at the correct time, timing means 116 will accelerate gear 120 up to speed, engage jaw clutch 108, and first tooth "X" of the series of teeth 148 of second sector gear 138 will disengage from gear 120.

In an alternate embodiment, geneva wheel 130 may be omitted from the mechanical mode shifter depicted in FIG. 7 in the event that a shorter timing interval is needed. In that situation, face cam 132 alone would be providing the timing function.

In another alternate embodiment, sector gears 136, 138 with an appropriate timing means, could be arranged such that output B remains at rest while input A begins its motion. Output B could then be accelerated up to speed and connected to the power train at any desirable time.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:
1. A mechanical mode shifter comprising:
   input means including a primary drive gear;
   first output means including gear means coupled to the primary drive gear of the input means for providing a continuous drive to the first output means;
   timing means including a driven gear coupled to said first output means, geneva means including sector gears attached thereto, and cam means for engagement with the geneva means;
   intermediate gear train means coupled to said timing means driven gear and cyclically coupled to said sector gears of said geneva means; and
   second output means coupled to the intermediate gear train means including clutch means, said second output means being disengageable through the engagement of said geneva means and said sector gears attached thereto with said intermediate gear train means, the engagement thereof causing said intermediate gear train means to decelerate and ground a shaft on said second output means and disengage said clutch means;
   whereby the second output means is driven cyclically while the first output means is driven continuously.
2. The mechanical mode shifter of claim 1 wherein the geneva means comprises an inverse geneva.
3. The mechanical mode shifter of claim 2 wherein the cam means comprise first and second axial cams.
4. The mechanical mode shifter of claim 3 wherein the first axial cam is a barrel cam, said axial barrel cam further including a gear member with first and second pins attached thereto, wherein said first pin is engageable with said inverse geneva and said second pin is movable in a slot around the periphery of the barrel cam causing said first pin to move both axially and circumferentially into engagement with said inverse geneva, thereby moving said sector gears attached to said geneva means about the center line of said timing means driven gear.
5. The mechanical mode shifter of claim 4 wherein said second axial cam is operatively associated with said barrel axial cam, said second axial cam further including third and fourth pins wherein said fourth pin is used to lock said inverse geneva.
6. The mechanical mode shifter of claim 1 wherein said sector gears comprise first and second sector gears, said first sector gear being in continuous engagement with said intermediate gear train means while said second sector gear is cyclically engageable with said intermediate gear train means.
7. The mechanical mode shifter of claim 6 wherein said first sector gear is a complete gear.
8. The mechanical mode shifter of claim 1 wherein said clutch means comprises a jaw clutch.
9. The mechanical mode shifter of claim 8, further including means for disengaging the jaw clutch comprising an axial cam in cooperation with a gear in meshing relation with the intermediate gear train means.
10. A mechanical mode shifter comprising:
    input means including a primary drive gear;
    first output means including gear means coupled to the primary drive gear of the input means for providing a continuous drive to the first output means;
    timing means including a driven gear coupled to said first output means, a geneva including sector gears attached thereto, a first axial cam in mesh relation with said first output means including a gear with a pin cooperable with the geneva for movement thereof, and a second axial cam for locking said geneva upon engagement thereof;

intermediate gear train means coupled to said timing means driven gear and cyclically coupled to said sector gears of said geneva means; and second output means coupled to the intermediate gear train means including clutch means, and means for disengaging the clutch means, said second output means being disengageable through the engagement of the geneva and associated sector gears with said intermediate gear train means, the engagement thereof causing said intermediate gear train means to decelerate and ground the shaft on said second output means and disengage said clutch means;

whereby the second output means is driven cyclically while the first output means is driven continuously.

11. The mechanical mode shifter of claim 10 wherein the geneva means comprises an inverse geneva.

12. The mechanical mode shifter of claim 11 wherein the first axial cam is a barrel cam, said axial barrel cam further including a gear member with first and second pins attached thereto, wherein said first pin is engageable with said inverse geneva and said second pin is movable in a slot around the periphery of the barrel cam causing said first pin to move both axially and circumferentially and into engagement with said inverse geneva, thereby moving said gear means attached to said geneva means about the center line of said timing means driven gear.

13. The mechanical mode shifter of claim 12 wherein said second axial cam is operatively associated with said barrel axial cam, said second axial cam further including third and third pins wherein said fourth pin is used to lock said inverse geneva.

14. The mechanical mode shifter of claim 10 wherein said sector gears comprise first and second sector gears, said first sector gear being in continuous engagement with said intermediate gear train means while said second sector gear is cyclically engageable with said intermediate gear train means.

15. The mechanical mode shifter of claim 10 wherein said clutch means comprises a jaw clutch.

16. The mechanical mode shifter of claim 10, wherein the means for disengaging the jaw clutch comprises an axial cam in cooperation with a gear in meshing relation with the first sector gear.

17. A mechanical mode shifter, comprising:
input means including a primary drive gear;
intermediate means including gear means coupled to the primary drive gear of the input means for providing a continuous drive to said intermediate means, and clutch means;
timing means including geneva means driven by said intermediate means, and cam means associated with said geneva means including first and second sector gears; and
output means coupled to said intermediate means, said output means being disengageable from said input means through the engagement of said first and second sector gears on said cam means with said intermediate means to decelerate and ground a shaft and disengage the clutch means on said output means, thereby grounding the output means;
whereby the output means is driven cyclically while the input means is driven continuously.

18. The mechanical mode shifter of claim 17 wherein said geneva means comprises a geneva drive gear coupled to said intermediate means, and a geneva wheel coupled to the geneva drive gear.

19. The mechanical mode shifter of claim 18 wherein said geneva drive gear includes an axial pin engageable with slots on the geneva wheel for providing intermittent motion to said geneva wheel.

20. The mechanical mode shifter of claim 19 wherein said geneva wheel is a six slot geneva.

21. The mechanical mode shifter of claim 20 wherein said cam means comprises a face cam, said face cam being connected to and rotatable with said geneva wheel providing a timing cycle for engagement of said first and second sector gears on said cam means with said intermediate means.

22. The mechanical mode shifter of claim 17, wherein said first sector gear is in continuous engagement with said intermediate means while said second sector gear is cyclically engageable with said intermediate means.

23. The mechanical mode shifter of claim 17 wherein said clutch means comprises a jaw clutch.

24. The mechanical mode shifter of claim 23 further including means for disengaging the jaw clutch comprising an axial cam in cooperation with a gear in meshing relation with the first sector gear.

25. A mechanical mode shifter, comprising:
input means including a primary drive gear;
intermediate means including gear means coupled to the primary drive gear of said input means for providing a continuous drive to said intermediate means, and clutch means;
timing means including a geneva drive gear in meshing relation with the intermediate means, the geneva drive gear including an axial pin engageable with a geneva wheel coupled to the geneva drive gear, said geneva wheel being coupled to and rotatable with a face cam, said face cam further including first and second sector gears for engagement with said intermediate means; and
output means coupled to said intermediate means, said outside means disengageable from said input means through the engagement of the first and second sector gears on said face cam with the intermediate mean to decelerate and ground a shaft and disengage the clutch means on said output means, thereby grounding the output means;
whereby the output means is driven cyclically while the input means is driven continuously.

26. The mechanical mode shifter of claim 25 wherein said geneva drive gear axial pin is engageable with slots on the geneva wheel for providing intermittent motion to the wheel.

27. The mechanical mode shifter of claim 25 wherein said geneva wheel is a six-slot geneva.

28. The mechanical mode shifter of claim 25, wherein said first sector gear is in continuous engagement with said intermediate means while said second sector gear is cyclically engageable with said intermediate means.

29. The mechanical mode shifter of claim 25, wherein said clutch means comprises a jaw clutch.

30. The mechanical mode shifter of claim 29 further including means for disengaging the jaw clutch comprising an axial cam in cooperation with a gear in meshing relation with the first sector gear.

* * * * *